FRACTIONATION OF CRUDE
POLYARYL POLYMETHYLENE POLYISOCYANATE

INVENTOR.
HERBERT L. HEISS
BY Clell W Zachund
ATTORNEY.

United States Patent Office

3,479,384
Patented Nov. 18, 1969

3,479,384
CRUDE POLYISOCYANATE COMPOSITIONS AND PREPARATION THEREOF
Herbert L. Heiss, New Martinsville, W. Va., assignor to Mobay Chemical Company, Pittsburgh, Pa., a corporation of Delaware
Filed Dec. 28, 1964, Ser. No. 421,433
Int. Cl. C07c 119/04; C08g 22/18
U.S. Cl. 260—453                                    7 Claims

ABSTRACT OF THE DISCLOSURE

Crude, liquid polyisocyanates are prepared utilizing an extracting medium comprising a solvent for substantially the entire product and a solvent which is a non-solvent for only the high boiling higher polymeric products of a phosgenation reaction product.

---

Figure 1:
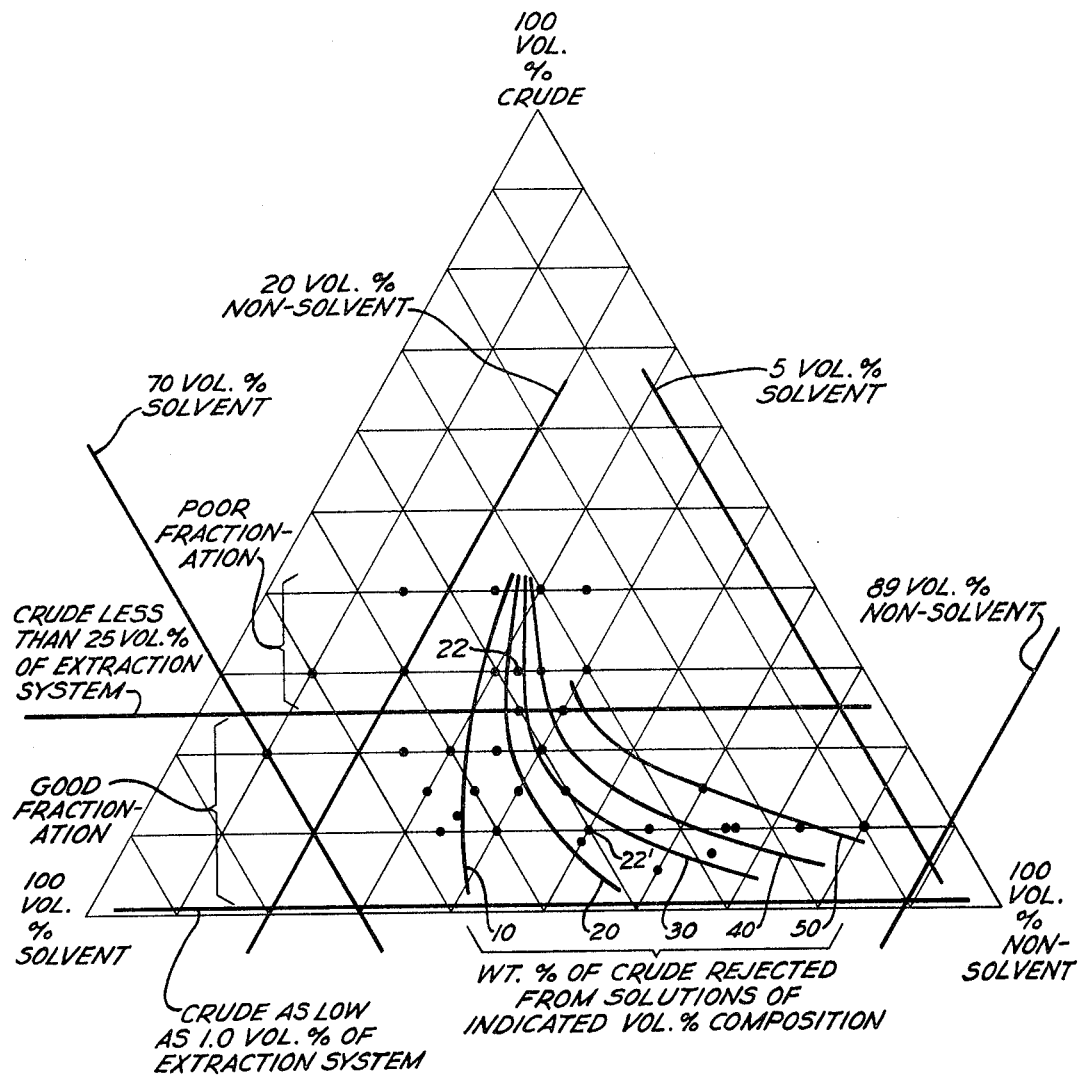

This invention relates to organic polyisocyanates, and more particularly to polyisocyanates which have improved compatibility with polyols in the preparation of a polyurethane and which exhibit markedly improved physical characteristics.

Organic isocyanates including 4,4'-diphenylmethane diisocyanate are prepared by the reaction between an organic amine or mixtures thereof and phosgene. The crude product of the phosgenation reaction in the preparation of 4,4'-diphenylmethane diisocyanate is composed of the isocyanate, dimers and homologues thereof and by-products of the reaction, that is, monomeric polyisocyanates, polymeric polyisocyanates and reaction by-products. Heretofore, the polyisocyanate has been recovered from this crude phosgenation product by distillation under reduced pressure requiring expensive equipment and a series of intricate steps to obtain a purity of 95 to 99% of the isocyanate. Due to the extremely high temperatures required to distill polyisocyanates from the crude material, excessive decomposition results with polymerization of the residue and, as a consequence, much of the expensive isocyanate is lost to the still bottoms. However, this is, relatively speaking, the most expedient means of obtaining the isocyanate from a crude phosgenation mixture, which isocyanate may then be reacted with an organic compound containing at least two reactive hydrogen atoms as determined by the Zerewitinoff method, to prepare a polyurethane.

The isocyanate recovered in the distillation process, however, is in the preparation of 4,4'-diphenylmethane diisocyanate, a solid material at room temperature, requiring either the use of a solvent or elevated temperatures to render it liquid and capable of being processed. It is generally undesirable to include an easily volatilized component such as a solvent in a polyurethane reaction mixture, though, and elevated temperatures require specialized equipment, particularly since the exotherm of the isocyanate-active hydrogen reaction is high enough to make the added heat required to maintain the isocyanate in liquid form contributive of disaster in the fabrication of polyurethanes and especially polyurethane foams. The solid state of 4,4'-diphenylmethane diisocyanate at room temperature, therefore, is particularly undesirable. Further, pure isocyanates have a volatility substantially greater than that of the crude isocyanate, which increases the hazard of the toxicity of isocyanates, in addition to which, pure isocyanates have a rather poor stability due to the formation of dimers.

The crude mixture resulting from the phosgenation reaction suffers from substantially fewer of these difficulties; however, the crude suffers from other rather substantial disadvantages which make its utilization difficult if not impossible in many cases. This anomaly is due to the fact that the crude isocyanate reaction product for the preparation of 4,4'-diphenylmethane diisocyanate is incompatible with such important reactants in the preparation of polyurethanes as polyalkylene ether polyols. In addition to being incompatible with polyalkylene ether polyols, the crude reaction product is discolored to the extent of being a dark brown, almost black oily material, due to the presence of the higher polymeric constituents and the by-products of the phosgenation reaction. Further, the uniformity of the crude reaction product varies from batch to batch, and even within each batch, so that crude phosgenation products generally lack uniformity and must be purified before use.

Recently, special utility has been found for crude polyaryl alkylene polyisocyanates, such as crude diphenylmethane diisocyanates which have not been predistilled or purified such as, for example, in the manufacture of castings, coatings, foams and the like materials. A major difficulty in the path of the development of these special utilities has been the decided lack of compatibility of polyaryl alkylene polyisocyanates with polyalkylene ether polyols due to the higher molecular weight fractions and the by-products resulting from the phosgenation of the corresponding amine or amine mixture. In addition, the crude iscyanate possesses detrimental physical characteristics such as a black color, high viscosity, and a tendency to become highly cross-linked due to the increased functionality of the higher polymeric constituents in a reaction with a compound containing active hydrogen atoms which are reactive with NCO groups. This tendency makes it impossible to produce linear polymers having good elongation and tear strengths. Further, the mixtures of the isocyanate with its higher homologues and/or the by-products of its manufacture are not always uniform and therefore do not always produce uniform products when reacted with an active hydrogen containing compound. In order to improve these characteristics of the crude isocyanate and yet retain the necessary higher functionality and higher polymeric materials therein, the distillation process mentioned hereinbefore is of no value since these higher molecular weight materials are so heat sensitive that they readily decompose on the application of heat. As a consequence, the development of use of substantially crude polyisocyanates has been considerably retarded since the black, oily, crude mixture of the polyisocyanate had to be used with all of its impurities, including compounds such as metal salts which influence the stability and reactivity of the crude material.

Consequently, attempts have been made to slightly improve the purity and, therefore, the compatibility of such mixtures of isocyanates with their higher polymeric products and by-products. One such method involves combining the isocyanate with epoxy compounds which contain a plurality of secondary hydroxyl groups in order to improve the mixing characteristics and compatibility of the crude with various polyols. This method suffers from numerous disadvantages, however, since the presence of a plurality of hydroxyl groups on the epoxy compound results in a considerable degree of cross-linking in the product, precluding any possibility of preparing a flexible product if such a product is desired.

The use of solvents for the reaction between the isocyanate mixtures and the polyol has not been found to be a good means for producing a compatible system since it is often not desirable to include easily volatilized materials in polyisocyanate-polyol systems.

Still another method proposed for improving the compatibility of crude isocyanates is to react a monofunctional compound containing only one reactive hydrogen atom as determined by the Zerewitinoff method with at least some and less than all of the free NCO groups of the isocyanate, its homologues and by-products. Although this method has found some utility, it is generally not practical since the isocyanate thus modified is highly viscous, retains the dark color of the crude, is still not of a completely uniform nature and has a poor shelf life. Castor oil has also been proposed as an aid for increasing the compatibility of crude isocyanate mixtures. However, the same objections remain; a non-uniform, darkly colored material which is nonetheless insufficiently compatible with polyhydric polyalkylene ethers.

It is therefore an object of this invention to provide organic polyisocyanates having improved compatibility with active hydrogen containing compounds, which isocyanates are devoid of the foregoing disadvantages.

A further object of this invention is to provide a method for the preparation of a crude mixture of polyisocyanates which is devoid of the objectional dark color generally inherent in crude mixtures.

Yet another object of this invention is to provide a means for preparing a polyisocyanate which is of an overall uniform nature.

Figure 2:
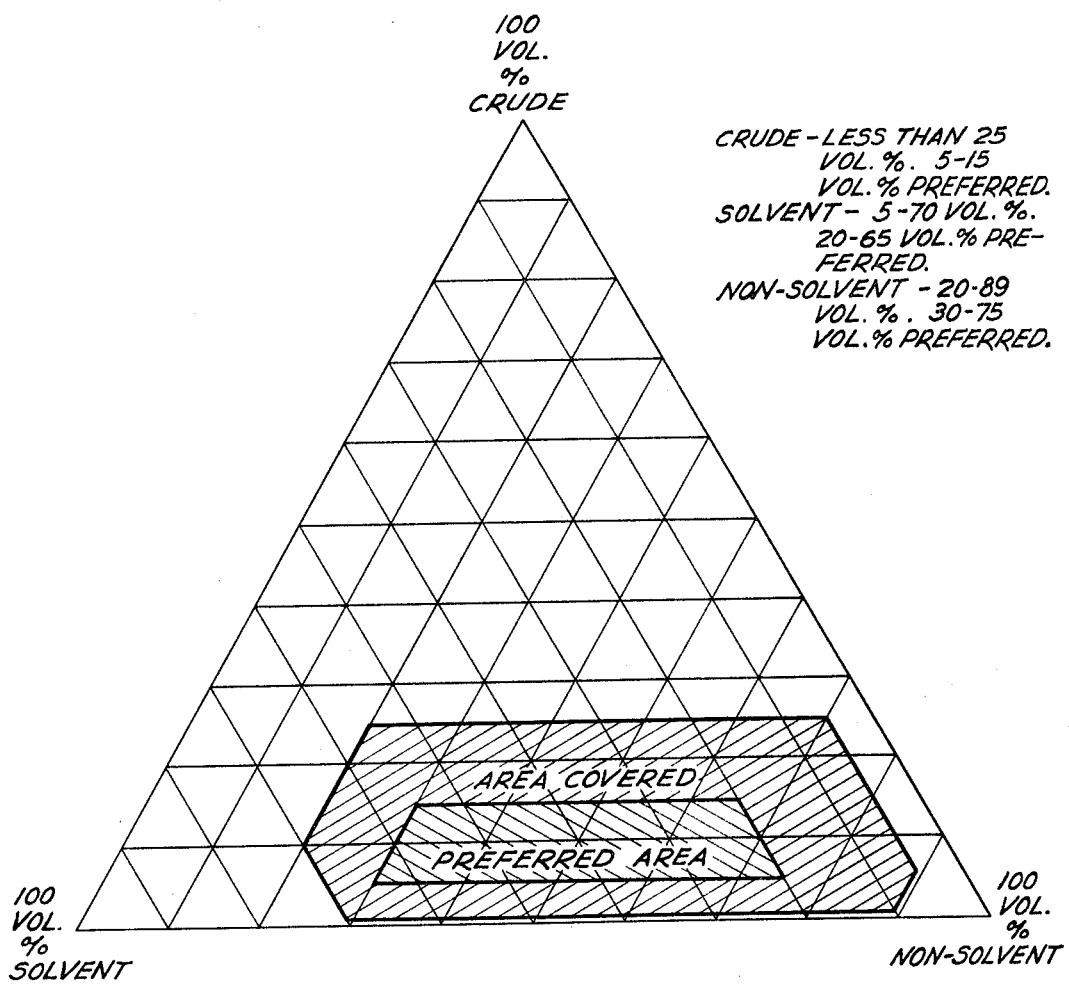

These and other objects which will become apparent from the following description and the accompanying drawings in which FIGURE 1 graphically illustrates various extraction system compositions and FIGURE 2 plainly designates the contemplated range of the invention and the preferred range thereof, are accomplished in accordance with this invention, generally speaking, by providing a process for the preparation of a liquid, substantially non-volatile organic polyisocyanate which comprises mixing the product of the reaction of phosgene with an organic polyamine in an extraction system having a volume of 100 percent in which at least about 75 volume percent of the extraction system is made up of an extraction medium comprised of two solvents, one of which, the first solvent, is present at a concentration of at least 5 volume percent of the entire extraction system and is a solvent for substantially the entire phosgenation product, while the other, the second solvent, is a non-solvent for only the high boiling, higher polymeric products and comprises substantially the remainder of the volume of the solvent portion of the extraction system, separating the two product layers which form from the mixture of the three constituents, and removing the product from each of the two layers to provide a purified, mixed polyisocyanate fraction and a higher molecular weight, high boiling fraction.

Therefore, by the process of this invention, a selective extraction process is carried out on the crude isocyanate hereinafter referred to simply as the crude. A small portion of the crude containing the by-products of the phosgenation reaction and the higher polymeric materials resulting therefrom is separated, or in other words, rejected from the crude material by the unique solvent system disclosed herein to yield a crude, liquid product which is substantially non-volatile, light in color, of low viscosity, and, most important, compatible with compounds containing hydrogen atoms which are reactive with NCO groups, and particularly, polyalkylene ethers.

Further, as little as about 5% of the crude isocyanate on a weight percent basis can be rejected in the preparation of a crude material having suitable properties whereas in the preparation of the pure isocyanate, more than about 15% and, in some cases, as high as 55% of the isocyanate is rejected. As an example, a crude mixture of p,p'-diphenylmethane diisocyanate, which is generally composed of a mixture of organic polyisocyanates having the generic formula:

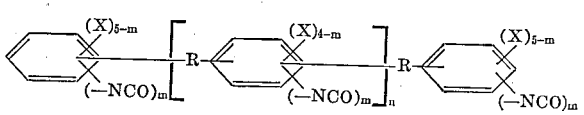

wherein R is an organic radical and preferably an aliphatic radical obtained by removing the carbonyl oxygen from an aldehyde or ketone and is preferably $-CH_2-$, $m$ is 1 or 2, X is a halogen, a lower alkyl group having from 1 to 4 carbon atoms, or hydrogen, and $n$ is 0, 1, 2 or 3 may be used. This mixture is composed of about 45 percent by weight of the diisocyanate, 30 percent by weight of the triisocyanate, and the balance tetra- and higher isocyanates, having an average functionality of about 2.7. To obtain a pure diisocyanate 55% of this crude material would have to be rejected; to obtain an isocyanate having the properties desired including a liquid consistency, compatibility with polyalkylene ether polyols, low viscosity, light color (Gardner color 6), and a lack of volatility, only about 30% of this crude material need be rejected in the extraction process.

Surprisingly enough, when as little as 8.5% of the crude isocyanate on a weight percent basis is rejected, the color of the crude is vastly improved (Gardner color 12). As a matter of fact, when only about 20% of the crude isocyanate is rejected, the color of the crude which was almost black initially, is improved to such an extent that the Gardner color values therefor range generally in the area of about 9 and even lower.

Most important, from the point of view of utilizing the crude mixture thus obtained, is the fact that the product of the selective extraction process or, looking at it another way, rejection process, is completely compatible with substantially all organic compounds containing hydrogen atoms which are reactive with NCO groups, including polyalkylene ethers. In addition, any metallic impurities present in the crude material are removed. This is particularly important since such impurities generally ruin the stability of the polyisocyanate and promote side reactions in the preparation of polyurethanes, as a consequence of which, control over the reaction of the crude materials is lost and inconsistency in the product results. Further, the mixed product obtained from the extraction process is a liquid product and is capable of being utilized at room temperature without further processing of any kind. The liquid product is extremely important when it is considered that a great deal of uses for isocyanates absolutely require that the isocyanate be in a liquid form at room temperature. In applications which involve spraying the components immediately on their admixture, it was hereteofore difficult if not impossible to use pure p,p'-diphenyl methane diisocyanate because the isocyanate is a solid material in its pure state.

The product of the extraction process of this invention also has a distinctly reduced viscosity value as compared to the crude. As a matter of fact, viscosity values far below 100 centipoises are normal as compared to a viscosity of about three times that value for the crude product.

The selective rejection of only the high boiling, highest polymeric fraction of a crude p,p'-diphenylmethane diisocyanate product and the color bodies which were unexpectedly expelled with the small portion of the crude product selectively rejected according to the process of this invention, is accomplished only at high solvent to crude ratios. That this requirement is of essential import in the practice of the present invention may be graphically illustrated by reference to FIGURE 1. As illustrated in FIGURE 1 by the converging lines representing 10, 20, 30, 40 and 50 percent rejection of the crude material, the crude p,p'-diphenylmethane diisocyanate mixture also begins to act as a solvent at concentrations of greater than about 20 or 25 volume percent resulting in poor fractionation of the components of the extraction system. In addition to the fact that good fractionation is obtainable only at lower concentrations of the crude isocyanate, preferably at concentrations of about 5 to 15 volume percent and most preferably at about 10 volume percent, where the concentration of the crude exceeds the above-defined limits, the isocyanate obtained tends to retain some of the poor characteristics of the crude. For example, where the concentration of the crude isocyanate is about 30 volume percent as indicated at point 22 on the graph, the extracted or "soluble" fraction (as opposed to the rejected or "insoluble" fraction) had a color much darker than the soluble fraction obtained where the concentration of the crude was 10 volume percent, and the solvent systems were adjusted to reject the same percent of the crude isocyanate (indicated at 22′). Where the characteristics of the product differ so widely depending on the initial concentration of the crude material in the solvent extraction system, it is readily apparent that it is a critical aspect of the present invention to maintain a concentration of the crude at preferably about 5 to 15 volume percent, but generally within the range of less than about 25 volume percent of the extraction system, the lower limit to be set by the limits of practicality in any given operation at the discretion of the operator. A precise area within which good results may be obtained in the practice of this invention is outlined by the solid lines in FIGURE 2 while the preferred ranges for the components of the extraction system are encompassed within the area enclosed by the broken lines in FIGURE 2.

Any suitable organic solvent which is free from groups or impurities reactive with NCO groups may be used. For example, any suitable organic solvent which also includes mixtures of solvents which will act as a good solvent for substantially the whole crude isocyanate mixture, and which is hereinafter referred to as the solvent, may be used with any suitable organic solvent which also includes mixtures thereof which will act as a non-solvent for the high boiling, higher polymers and reaction by-products of the crude, and which is hereinafter referred to as the non-solvent. Generally it is preferable to choose a solvent and non-solvent which has a boiling point within the range of about 20° C. to about 170° C. and preferably from about 40° C. to about 120° C. to permit ease of handling of the extraction mixture and to allow for an easy separation of the isocyanate and the extracting medium when the extraction process has been completed. It is also desirable to choose a solvent pair, each member of which has a specific gravity sufficiently different from that of the other to permit easy monitoring of the composition of the blend, especially where a continuous extracting process is used. For that reason, it has been found to be most preferable to employ as the solvent, a solvent or solvents which are free of oxygen atoms, and as the non-solvent, an alkyl hydrocarbon preferably having about 6 to about 12 carbon atoms or mixture thereof, but most preferably, carbon tetrachloride as the solvent and n-hexane as the non-solvent. The carbon tetrachloride is capable of dissolving substantially all of the constituents of the crude isocyanate, and the hexane, preferably n-hexane, is a non-solvent for the high polymeric portions of the crude isocyanate mixture. Other suitable organic solvents for the entire crude isocyanate mixture which may also be used are aromatic hydrocarbons such as, for example, xylene, octylbenzene, isobutylbenzene, benzene, toluene, styrene, 2-propenylbenzene; halogenated hydrocarbons such as 1,1,1,3 - tetrachlorotetrafluoropropane, 1,1,1 - trichloropentafluoropropane, 1,1,1 - dichlorofluoro-2,2,2-chlorodifluoroethane, dibromotetrafluoroethane, 1,1,1-dichlorofluoro-2,2,2-dichlorofluoroethane, carbon tetrachloride, trichloro ethylene, chloroform, methylene chloride, bromobenzene, ethylene dichloride, ethylene bromide, chloro benzene, dichloro benzene, propylene dichloride, butyl chloride, perchloroethylene, trichlorofluoromethane and the like; petroleum solvent mixtures that contain both alkyl and aromatic hydrocarbons, methyltetrahydrofuran, esters of alcohols having up to 6 carbon atoms and esters of acids having up to 6 carbon atoms such as ethyl acetate, propyl acetate, butyl acetate, amyl acetate, hexyl acetate and the like as long as the boiling points thereof are within the above-defined range; terpenes including p-menthane, camphene, pinane, pinene, dipentene, pinol, camphor, turpentine and the like; ketones including diisobutyl ketone, cyclohexanone, 2,4-pentanedione, methyl ethyl ketone, acetone, dipropyl ketone, methyl isobutyl ketone, mixtures of the above and the like. Some suitable non-solvents for the high polymeric portion of the crude mixture are aliphatic hydrocarbons including n-heptane, n-octane, n-nonane, n-decane, isomers thereof and the like; paraffin oil, 1-pentene, 1-hexene, 1-heptene, 1-octene, 1-nonene, 1-decene, isomers thereof and the like, gasoline and solvent naphthas low in aryl content, mixtures of the above and the like.

It is entirely within the discretion of the operator practicing this invention to choose the method most desirable for treating the crude with the solvent pair chosen. That is, it has been found that there is substantially no difference in results at a given final composition when the non-solvent was added to the crude isocyanate/solvent solution, or when the crude isocyanate was added to the solvent/non-solvent blend.

Whatever the choice of solvents may be, at least 5 volume percent of the entire extraction system should be comprised of a solvent which is capable of dissolving substantially the entire crude product, with the remainder of the solvent mixture to be comprised of a liquid which is specifically a non-solvent for only the high boiling, highest polymeric portions and the by-products of the crude reaction mixture resulting from the phosgenation of a polyamine. Within this limit the amount of solvent used to dissolve the crude may be any volume percentage of the solvent system which is not consumed by the presence of a sufficient amount of non-solvent to reject the fraction of the crude product desired.

Where the preferred solvent pair is used, the upper limit of the concentration of the solvent (carbon tetrachloride) should be about 70 volume percent of the total mixture and the range for the non-solvent (n-hexane) should be about 20 to about 90 volume percent of the total system. The most preferable range of concentration of solvent and non-solvent for the carbon tetrachloride/hexane solvent system is from about 20 to about 65 volume percent of solvent and about 30 to about 75 volume percent of non-solvent based on the volume of the total extraction mixture including the crude polyisocyanate which is most preferably present at a concentration of about 10 volume percent based on the volume of the entire mixture. In any case, no matter what solvent/non-solvent system is chosen, it is necessary to maintain a concentration of at least 5 volume percent of solvent in the total extraction system. The amounts of the solvent and non-solvent may be varied within these limits and the amount of the solvent and non-solvent system to be used with the crude isocyanate in an extraction system may also be varied within the above-defined limits to selectively reject whatever fraction of the crude may be necessary so that the remainder of the crude may be used in the desired application. For example, if the isocyanate need not have a functionality below 4 or the Gardner color need not be as low as 5 or 6, a smaller portion of the crude may be rejected as long as the remaining properties meet the required specification and a good extraction may be obtained.

Although the description of the invention up to this point has been concerned mainly with crude mixtures of p,p′-diphenylmethane diisocyanate it is to be understood that any polyaryl alkylene polyisocyanate may be so treated. Such polyisocyanates are generally mixtures of organic polyisocyanates having the generic formula:

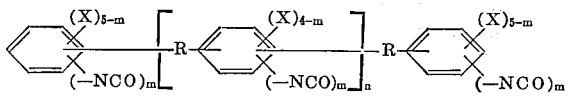

in which R is an organic radical and preferably an aliphatic radical obtained by removing the carbonyl oxygen from an aldehyde or ketone and is preferably —CH$_2$—, m is 1 or 2, X is halogen, lower alkyl or hydrogen and n is 0, 1, 2, or 3. The aliphatic radical, R, in the foregoing formula may be obtained by removing the carbonyl oxygen from any suitable aldehyde or ketone such as, formaldehyde, acetaldehyde, propionaldehyde, butyraldehyde, N-heptaldehyde, benzaldehyde, cyclohexane aldehyde, acetone, methyl ethyl ketone, methyl-n-propyl ketone, diethyl ketone, hexanone-2, hexanone-3, di-n-propyl ketone, di-n-heptyl ketone, benzophenone, dibenzyl ketone, cyclohexanone and the like. To illustrate, if one removes the carbonyl oxygen from formaldehyde, $H_2C=O$, the radical remaining is a methylene radical or from acetone, $CH_3—CO—CH_3$, the radical remaining is

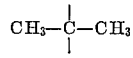

When X is halogen, it may be any suitable halogen but is preferably chlorine or bromine and further, it is preferred that the amount of chlorine or bromine fall between about one per cent and fifteen per cent by weight of the compound. When X is lower alkyl, it is most preferably methyl or ethyl but other lower alkyl radicals such as propyl, butyl and the like may be the radical, X. The polyaryl alkylene polyisocyanates of the invention are preferably mixtures of di- and higher polyisocyanates. Thus, $n$ in the formula preferably has a value of from about 0.1 to about 1.5. To illustrate, in a mixture of isocyanates of the above formula containing 90 percent diisocyanate and 10 percent triisocyanate, $n$ would have a value of 0.1. For a mixture containing 20 percent di-, 30 percent tri-, 30 percent tetra- and 20 percent pentaisocyanate, the average value of $n$ would be 1.5. A most preferred value for $n$ is between about 0.85 and about 1.1 with about 40 percent to above 60 percent of the mixture of polyisocyanates being a diisocyanate.

Isocyanates of the above formula are well-known and available commercially. They may be prepared as disclosed in U.S. Patent 2,683,730. A specific isocyanate suitable for use in accordance with the present invention may be obtained by reacting about 60 parts of aniline with about 25 parts of formaldehyde (aqueous, 37 percent $CH_2O$) and about 74 parts of HCl (aqueous, 30 percent HCl) at a temperature of about 90° C. to about 100° C. for about 1.5 to about 2 hours and then reacting this product with NaOH and separating out the crude amine. About 100 parts of phosgene are then reacted with the resulting amine until a product having an amine equivalent of about 135 and containing about 31 percent free —NCO is obtained. The free excess phosgene and substantially all of the solvents used, if any, are then removed.

The commercially available polyphenyl methane polyisocyanates are particularly adapted for use in the present invention. The best products have 40 percent to 60 percent 4,4'-diphenylmethane diisocyanate, an amine equivalent of about 125 to about 140, about 0.04 to about 0.4 percent by weight hydrolyzable chloride, about 0.1 to about 0.6 percent by weight total chloride and having a flash point of above about 400° F.

In addition, any other organic polyisocyanate may be treated in accordance with the process outlined herein, including aliphatic and aromatic polyisocyanates. Specific examples of some such polyisocyanates which may be treated in accordance with this invention are tetramethylene diisocyanate,
hexamethylene diisocyanate,
1,4-phenylene diisocyanate,
1,3-phenylene diisocyanate,
1,4-cyclohexylene diisocyanate,
2,4-tolylene diisocyanate,
2,5-tolylene diisocyanate,
2,6-tolylene diisocyanate,
3,5-tolylene diisocyanate,
4-chloro-1,3-phenylene diisocyanate,
1-methoxy-2,4-phenylene diisocyanate,
1-methyl-3,5-diethyl-2,6-phenylene diisocyanate,
1,3,5-triethyl-2,4-phenylene diisocyanate,
1-methyl-3,5-diethyl-2,4-phenylene diisocyanate,
1-methyl-3,5-diethyl-6-chloro-2,4-phenylene diisocyanate,
6-methyl-2,4-diethyl-5-nitro-1,3-phenylene diisocyanate,
p-xylylene diisocyanate,
m-xylylene diisocyanate,
4,6-dimethyl-1,3-xylylene diisocyanate,
1,3-dimethyl-4,6-bis-(beta-isocyanatoethyl) benzene,
3-(alpha-isocyanatoethyl) phenyl isocyanate,
1-methyl-2,4-cyclohexylene diisocyanate,
4,4'-biphenylene diisocyanate,
3,3'-dimethyl-4,4'-biphenylene diisocyanate,
3,3'-dimethoxy-4,4'-biphenylene diisocyanate,
3,3'-diethoxy-4,4'-biphenylene diisocyanate,
1,1'-bis-(4-isocyanatophenyl)cyclohexane,
4,4'-diisocyanatodiphenylether,
4,4'-diisocyanato-dicyclohexylmethane,
4,4'-diisocyanatodiphenylmethane,
4,4'-diisocyanato-3,3'-dimethyldiphenylmethane,
4,4'-diisocyanato-3,3'-dichlorodiphenylmethane,
4,4'-diisocyanato-diphenyl-dimethylmethane,
1,5-naphthylene diisocyanate,
1,4-naphthylene diisocyanate,
2,4,4'-triisocyanato-diphenylether,
2,4,6-triisocyanato-1-methyl-3,5-diethylbenzene,
o-tolidine-4,4'-diisocyanate,
m-tolidine-4,4'-diisocyanate,
benzophenone-4,4'-diisocyanate, and the like.

Although the invention has been described more or less as a batch-type process, it is apparent that it may be readily adapted to a continuous type process in which the use of concentrations of the crude below 5% (volume percent) becomes more practical. In a continuous system, it is also more expedient to use the lower concentration of the solvent in the solvent-non-solvent extracting medium. For example, where it is generally more expedient to use concentrations of solvent in the extracting system of at least about 10 volume percent or more in a batch-type of operation, where a continuous operation is being carried out, lower concentrations of the solvent will also give good extractions. In such instances, concentrations of at least about 5 volume percent of the solvent in the extracting system are feasible and, indeed, in some cases, even desirable. In one such continuous extraction system, the crude isocyanate is dribbled into the extraction system in a column which may be equipped with a stirrer for more efficient mixing. The isocyanate may be added either alone or while dissolved in the solvent constituent of the extraction system as desired. As mentioned hereinbefore, it makes no difference what sequences are used or what components of the extraction system are mixed together initially, the results do not differ substantially and the same efficiency of operation is achieved in any case. The crude isocyanate which is monitored into the column is finely divided in the mixed solvent system, and by the time it has traveled the length of the column, the extraction has been completed. The insolubles are deposited at the bottom of the column while the soluble fraction is collected near the top of the column, for example, by means of an overflow valve. The non-solvent is distilled from the product layer thus collected and is adjusted to the desired composition before it is allowed to reenter the system. The insoluble fraction at the bottom of the column remains in a plasticized state due to the effect of the solvent portion of the extraction medium and is therefore easily siphoned off at the base of the column to be discarded or otherwise treated as desired. Preferably, the crude isocyanate is added to the extracting system while dissolved in some of the solvent portion of the extracting medium. The ratio of solvent to non-solvent may be easily maintained if a solvent pair is chosen, each member of which has a specific gravity which differs greatly enough from that of the other member. In such a process, the limits of practicability allow concentrations as low as 1 volume percent to be used, keeping in mind that it is critical in the practice of this invention to maintain a solvent system to crude ratio which is at least about 75 to 25.

The isocyanates thus isolated may then be used in any application for which isocyanates are peculiarly adapted. For example, they may be reacted with compounds containing hydrogen atoms which are reactive with NCO groups to prepare polyurethane foams, coatings and elastomers and the like.

The invention is further illustrated but is not intended to be limited by the following examples in which all parts and percentages are by weight unless otherwise specified.

EXAMPLE 1

(A) About 60 parts of aniline is reacted with about 25 parts of formaldehyde (aqueous, 37% $CH_2O$) and about 74 parts of HCl (aqueous, 30% HCl) at a temperature of about 90° C. to about 100° C. for about 1.5 to about 2 hours and this product is then reacted with NaOH and the crude amine is separated out. The crude amine is then phosgenated by condensing it with a substantial molar excess of phosgene to produce an isomeric mixture of the corresponding isocyanates.

(B) 9.5 volume percent, based on the volume of the entire solution, of the product obtained is then treated as below indicated with 40.8 volume percent of carbon tetrachloride and 49.7 percent of n-hexane.

TABLE I.—EFFECT OF ADDITION SEQUENCE *

| Addition | Soluble Fraction Weight Percent of Crude | Color | Percent NCO |
|---|---|---|---|
| Add hexane to crude/$CCl_4$ solution | 78.2 | Amber | 32.5 |
| Add $CCl_4$/hexane blend to crude | 78.6 | do | 32.3 |
| Add crude to $CCl_4$/hexane blend | 78.2 | do | 32.4 |

*All cases: 9.5 vol. percent crude, 40.8 vol. percent carbon tetrachloride, 49.7 vol. percent n-hexane.

This data indicated that the recycling of the mixed solvent is possible since it is not necessary to first dissolve the crude material in the solvent and then add the non-solvent.

EXAMPLE 2

The product obtained from the process of Example 1 (A) is mixed with hexane and carbon tetrachloride with a propeller type agitator for about 15 minutes at room temperature. The mixture separates into a first layer and a second smaller, darker, lower layer, and is allowed to stand for about 30 minutes. The dark fraction from the lower layer is referred to as the "rejected" or "precipitated material," and the light fraction in the upper layer is referred to as the "soluble" material.

The solvent layers are separated and the solvent is distilled from each. The distillation is completed by heating the product at about 100° C. at 3–5 mm. pressure. The results are graphically illustrated in the accompanying triangular graph which indicates the degree of fractionation obtained for various solvent/non-solvent/crude compositions. It is to be noted that the components are indicated as volume percent disregarding shrinkage due to mixing; for example, 20 ml. of crude plus 20 ml. of carbon tetrachloride plus 60 ml. of n-hexane does not necessarily yield 100 ml. of solution.

Referring now to the graph designated as FIGURE 1, the various points on the graph indicate compositions prepared by the method outlined in the example. As indicated on the graph, at concentrations above about 20 to about 25 volume percent of the crude in the extraction system, poor fractionation is obtained. The six-sided figure defined in FIGURE 2 indicates the approximate limits of concerntration of the three components of the extraction system to obtain good fractionation in addition to obtaining a product having the best properties with the very best results and most preferred ranges enclosed by the four-sided figure.

As a further illustration of this aspect of the invention, the table below collates data illustrative of the difficulty encountered when the concentration of the crude exceeds the limits outlined hereinbefore. This difficulty, as already pointed out, results from the phenomenon in which the crude itself begins to act as a solvent thus preventing good fractionation. Using the crude material prepared in Example 1(A), the runs A, B and C were adjusted to provide about a 25% rejection of the crude, but at different solvent to crude ratios. It is worthy of note that run A at 30 volume percent of crude did not provide good fractionation even though about 22% of the crude was rejected, although in run B where only 9.5 volume percent of the crude polyisocyanate was used a much more desirable fractionation was obtained with substantially the same (23.2% rejection of the crude.

TABLE II.—EFFECT OF CONCENTRATION

| Run | Vol. percent Crude | Fraction | Weight percent of Crude | Color | Percent NCO |
|---|---|---|---|---|---|
| A | 30.0 | Soluble | 77.7 | Brown | 31.1 |
|   |      | Rejected | 23.2 | do |  |
| B | 9.5 | Soluble | 78.2 | Amber | 32.5 |
|   |     | Rejected | 22.3 | do |  |
| C | 5.0 | Soluble | 76.5 | Lt. yellow | 32.5 |
|   |     | Rejected | 24.4 | do |  |

NOTE.—The soluble plus rejected fractions of the crude add up to greater than 100% because of small amounts of retained solvents.

EXAMPLE 3

The product obtained from the process of Example 1(A) is mixed according to the process of Example 2 in various concentrations of solvent to non-solvent as indicated in the table below. The results of various tests on the fractions obtained are outlined in the table and indicate the influence of various solvent to non-solvent ratios with reference to efficiency of extraction and the properties of the product obtained.

TABLE III.—TYPICAL FRACTIONATION

|  | Control Crude | A | B | C | D | E | F |
|---|---|---|---|---|---|---|---|
| Charge, vol. percent: |  |  |  |  |  |  |  |
| Crude | 100 | 10 | 10 | 10 | 10 | 10 | 10 |
| $CCl_4$ | 0 | 56 | 41 | 33 | 24 | 17 | 10 |
| Hexane | 0 | 34 | 49 | 57 | 66 | 73 | 80 |
| Light-Colored Fraction: |  |  |  |  |  |  |  |
| Wt. percent of Crude Charged | 100 | 93 | 80 | 71 | 61 | 52 | 44 |
| Percent NCO | 31.5 | 32.0 | 32.8 | 32.9 | 33.4 | 33.4 | 33.4 |
| Gardner Color | >18 | 12 | 9 | 6 | 5 | 5 | 5 |
| Visc. at 25° C., cps.[1] | 300 | ca. 100 |  |  |  |  | ca. 50 |
| Ether Compatibility [2] | Poor | Poor | Fair | [3] | [3] | [3] | [3] |
| Dark-Colored Fraction: |  |  |  |  |  |  |  |
| Wt. percent of Crude Charged | 0 | 8.5 | 20.5 | 29 | 40 | 49 | 56 |
| Percent NCO |  |  |  |  |  |  | 30.3 |
| Visc. at 25° C., cps.[1] |  | Solid | Tar | Tar | 10,000 | 4,000 | 3,000 |
| Ether Compatibility [2] | Poor | Poor | Poor | Poor | Poor | Poor | Poor |

[1] Measured with Gardner bubble tubes.
[2] A propylene oxide condensate having a molecular weight of between about 200 and 3,000 was used for the ether compatibility test.
[3] Excellent.

EXAMPLE 4

A crude toluylene diisocyanate prepared by the phosgenation of toulylene diamine is mixed with the solvent systems outlined below. As can be seen, where concentrations of the crude exceeding 25 volume percent were used, poor fractionation results making it impossible to obtain the desired product.

TABLE IV.—SOLVENT FRACTIONATION OF CRUDE TOLUYLENE DIISOCYANATE

| | Volume percent | | | Light Colored Fraction | |
|---|---|---|---|---|---|
| | Crude | CCl₄ | Hexane | Weight percent of Crude | Gardner Color |
| A | 50 | 0 | 50 | | |
| B | 40 | 0 | 60 | | |
| C | 33 | 0 | 67 | Very poor fractionation | |
| E | 31 | 8 | 61 | | |
| F | 38 | 14 | 58 | | |
| G | 25 | 13 | 62 | 18 | 12 |
| H | 22 | 22 | 56 | 11 | 14 |
| D | 18 | 0 | 83 | 28 | 6 |
| I | 17 | 17 | 66 | 17 | 10 |
| J | 15 | 22 | 63 | 14 | 11 |

EXAMPLES 5 TO 46

A series of extractions were run using a crude polyaryl polymethylene polyisocyanate. The crude was dissolved in the solvent and the non-solvent was added thereto. The mixture was allowed to stand for a half hour, after which time the upper layer was poured off and the solvent was evaporated from each layer separately. The insoluble or rejected fraction was weighed to determine the weight percent of the crude rejected and the Gardner color of the soluble fraction was determined. The data obtained was tabulated and is reproduced in the following table.

As can readily be observed, the systems which yielded the lightest Gardner colors with the least amount of rejection of the crude material were those which employed a high extraction medium (including both solvent and non-solvent) to crude ratio. The higher the ratio of the extracting medium to crude, the better results are obtained. Further as can be seen from the table, in order to get the best color with the least rejection as a function of the constituents of the solvent pair chosen, it is advisable to choose as the solvent one which will dissolve substantially all of the crude material, but only just barely. The worse the solvent is while still dissolving substantially the whole crude, the better the extraction. For that reason, oxygen-containing solvents are not as expedient as those which do not contain oxygen, as is illustrated where such solvents are used in the table above. The oxygen containing solvents are far too efficient as solvents and demonstrate an affinity for both the desired components and the undesired components of the crude.

In addition, where solvents are used which have boiling points near the outer limits defined hereinbefore, the soluble fraction tends to be rather viscous and it is believed that the increased viscosity is due to the polymerization of the isocyanate at the higher temperatures required to distil off the solvent.

It is to be understood that any of the solvents or mixtures thereof and any of the polyisocyanates designated herein as suitable for the same purpose may be substituted for their counterparts in the foregoing examples and that although the invention has been described in considerable detail in the foregoing, such detail is solely for the purpose of illustration and variations may be practiced by one skilled in the art without departing from the spirit and scope of the invention.

TABLE V

| Crude, Ml. | Solvent | Ml. | Non-Solvent | Ml. | Weight Percent of Crude Rejected | Gardner Color of Soluble Fraction |
|---|---|---|---|---|---|---|
| 100 | CCl₄ | 330 | Hexane | 570 | 28 | 6 |
| 100 | CCl₄ | 330 | Stoddard solvent | 570 | 23 | 1 |
| 100 | CCl₄ | 330 | Petroleum ether, B.P. 30–60° C | 570 | 34 | 17 |
| 100 | CCl₄ | 330 | n-Decane | 570 | 32 | 7 |
| 100 | CCl₄ | 330 | 2,2,5-trimethyl hexane | 570 | 45 | 8 |
| 100 | Benzene | 330 | Hexane | 570 | 13 | >18 |
| 100 | Chlorobenzene | 330 | do | 570 | 8 | >18 |
| 100 | 1,4-dioxane | 330 | do | 570 | 1.2 | >18 |
| 100 | Methyl ethyl ketone | 330 | do | 570 | 1.0 | >18 |
| 100 | Ethyl acetate | 330 | do | 570 | 1.2 | >18 |
| 85 | Benzene | 281 | do | 634 | 16 | 9 |
| 85 | Chlorobenzene | 281 | do | 634 | 14 | 11 (cloudy) |
| 85 | 1,4-dioxane | 281 | do | 634 | 9 | 14 |
| 85 | Methyl ethyl ketone | 281 | do | 634 | 4 | >18 |
| 85 | Ethyl acetate | 281 | do | 634 | 6 | >18 |
| 100 | Methyl ethyl ketone | 250 | do | 650 | 8 | 18 |
| 100 | do | 175 | do | 725 | 27 | 12 |
| 100 | Ethyl acetate | 250 | do | 650 | 11 | 16 |
| 100 | do | 175 | do | 725 | 28 | 11 |
| 90 | Benzene | 340 | Cyclohexane | 570 | 17 | 11 |
| 100 | do | 450 | Hexane | 450 | 2.5 | >18 |
| 100 | Toluene | 450 | do | 450 | 4.7 | 14 |
| 100 | Mixed xylenes | 450 | do | 450 | 8.3 | 13 |
| 100 | Mixed diethyl benzenes | 450 | do | 450 | 27 | [1] 16 |
| 100 | n-Butyl benzene | 450 | do | 450 | 20 | [1] 11 |
| 100 | CHCl₃ | 450 | do | 450 | One phase— no separation | |
| 100 | CH₂Cl₂ | 450 | do | 450 | | |
| 100 | 1,1,2,2-tetrachloro-1,2-difluoroethane | 450 | do | 450 | 38 | 9 |
| 100 | 1,1,2-trichloro-1,2,2-trifluorethane | 450 | do | 450 | 63 | 8 |
| 100 | Tetrachloroethylene | 450 | do | 450 | 14 | 11 |
| 100 | 1,2,2-trichloroethylene | 450 | do | 450 | 1.2 | >18 |
| 100 | CCl₄ | 450 | do | 450 | 17 | 12 |
| 100 | 1,2-dichloroethane | 450 | do | 450 | No phase separation | |
| 100 | 1,2,3-trichloro propane | 450 | do | 450 | | |
| 100 | 1,4-dichlorobutane | 450 | do | 450 | | |
| 100 | 1-chlorobutane | 450 | do | 450 | 13 | 10 |
| 40 | Perchloroethylene | 132 | Petroleum ether, B.P. 30–60° C | 228 | 29.1 | 5 |
| 40 | do | 132 | Petroleum ether, B.P. 65–110° C | 228 | 17.7 | 10 |
| 40 | Trichloroethylene | 132 | Petroleum ether, B.P. 30–60° C | 228 | 20.2 | 12 |
| 40 | do | 132 | Petroleum ether, B.P. 65–110° C | 228 | 7.3 | 15 |
| 40 | Benzene | 132 | Petroleum ether, B.P. 30–60° C | 228 | 19.0 | 11 |
| 40 | do | 132 | Petroleum ether, B.P. 65–110° C | 228 | 5.8 | 18 |

[1] Soluble fraction was viscous, presumably due to isocyanate polymerization at the higher temperatures required to remove the solvent.

What is claimed is:

1. A process for preparing a crude, liquid, substantially non-volatile, polyaryl polyalkylene polyisocyanate, said polyisocyanate being compatible with compounds containing hydrogen atoms which are reactive with NCO groups, wherein said polyaryl polyalkylene polyisocyanate has the general formula:

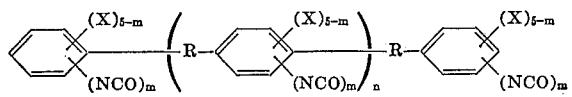

wherein R is an organic radical obtained by removing the carbonyl oxygen from a member selected from the group consisting of an aldehyde and a ketone, $m$ is selected from the group consisting of 1 and 2, X is selected from the group consisting of halogen, a lower alkyl group having from 1 to about 4 carbon atoms and hydrogen and $n$ is selected from the group consisting of 0, 1, 2 and 3, by selective extraction of a portion of higher polymeric materials and reaction by-products from a crude phosgenation product comprising phosgenating an organic polyaryl polyalkylene polyamine to produce a crude phosgenation product which includes a mixture of monomeric organic polyisocyanates, higher molecular weight polymeric polyisocyanates and reaction by-products, mixing said crude phosgenation product with an extracting medium comprising a first solvent and a second solvent to form an extraction system in which said first and said second solvents are collectively present at a concentration of at least about 75 volume percent of said extraction system and said crude phosgenation product is present at a concentration of less than about 25 volume percent of said extraction system, said first solvent being an organic solvent free of oxygen atoms and free from groups or impurities reactive with NCO groups and being a solvent for substantially the entire crude phosgenation product and comprising at least about 5 volume percent of said extraction system, said second solvent being an aliphatic hydrocarbon free from groups or impurities reactive with NCO groups and being a non-solvent only for higher molecular weight polymeric products and reaction by-products of said crude phosgenation product and comprising substantially the remainder of the solvent volume portion of said extraction system, permitting the mixture of the three constituents to form two layers, a first layer comprising substantially said first solvent and a selective portion of the higher molecular weight polymeric products and reaction by-products of the crude phosgenation product and a second layer comprising substantially said second solvent and said crude, liquid, substantially non-volatile polyaryl polyalkylene polyisocyanate, separating the two layers formed and separating said crude, liquid, substantially non-volatile polyaryl polyalkylene polyisocyanate from the solvent portion of said second layer.

2. The process of claim 1 wherein said crude phosgenation product comprises from about 1 to about 25 volume percent of the entire extraction system, said first solvent comprises from about 5 to about 70 volume percent of the entire extraction system and said second solvent comprises from about 20 to about 89 volume percent of the entire extraction system.

3. The process of claim 1 wherein said crude phosgenation product comprises from about 5 to about 15 volume percent of the entire extraction system, said first solvent comprises from about 20 to about 65 volume percent of the entire extraction system and said second solvent comprises from about 30 to about 75 volume percent of the entire extraction system.

4. The process of claim 1 wherein said first solvent is $CCl_4$ and said second solvent is $n$-hexane.

5. The process of claim 1 wherein said first solvent is selected from the group consisting of aromatic hydrocarbons, halogenated hydrocarbons, petroleum solvent mixtures containing both alkyl and aromatic hydrocarbons, terpenes and mixtures thereof and said second solvent is selected from the group consisting of alkyl hydrocarbons having from 6 to 12 carbon atoms, paraffin oil, 1-pentene, 1-hexene, 1-heptene, 1-octene, 1-nonene, 1-decene, gasoline solvent, naphthas low in aryl content and mixtures thereof.

6. A crude, liquid, substantially non-volatile polyaryl polyalkylene polyisocyanate prepared by the process of claim 1.

7. A crude, liquid, substantially non-volatile polyaryl polyalkylene polyisocyanate having a Gardner color of a maximum of about 12, a viscosity of a maximum of about 100 centipoises and being compatible with compounds containing hydrogen atoms which are reactive with NCO groups and being prepared by the process of claim 1.

References Cited

UNITED STATES PATENTS

| | | | |
|---|---|---|---|
| 2,683,730 | 7/1954 | Seeger et al. | 260—453 |
| 2,938,054 | 5/1960 | Demers et al. | 260—453 XR |
| 3,097,191 | 7/1963 | France et al. | 260—453 XR |
| 3,144,474 | 8/1964 | Kantyka et al. | 260—453 |
| 3,211,631 | 10/1965 | Fuchs | 260—453 XR |
| 3,294,713 | 12/1966 | Hudson et al. | 260—453 XR |
| 3,317,481 | 5/1967 | Youker | 260—453 XR |

CHARLES B. PARKER, Primary Examiner

D. H. TORRENCE, Assistant Examiner

U.S. Cl. X.R.

23—312; 106—122; 117—61; 260—2.5, 77.5, 570, 705